Patented June 19, 1934

1,963,138

UNITED STATES PATENT OFFICE 1,963,138

PREPARATION OF AMIDES

Herbert E. Martin and Robert Finley Thompson, Cumberland, Md., assignors to Celanese Corporation of America, a corporation of Delaware No Drawing. Application September 20, 1930, Serial No. 483,374

6 Claims. (Cl. 260—124)

This invention relates to the preparation of acid amides and relates more particularly to the preparation of acetamide or other aliphatic acid amides.

An object of our invention is to produce acid amides more cheaply than has heretofore been possible. A further object of our invention is to prepare acid amides which are purer than those made previously on a commercial scale. Other objects of this invention will appear from the following detailed description.

The method heretofore employed for making acetamide commercially consists in reacting ammonium carbonate or ammonia with an excess of acetic acid to form ammonium acetate and then distilling off the excess acetic acid. During distillation the ammonium acetate is converted into acetamide which remains as a residue in the still. This method is open to many objections, among which are the facts that low yields are obtained, a long time is required for conversion and distillation, decomposition with the formation of methyl cyanide takes place, and the resulting product contains an appreciable amount of impurities.

Furthermore, in the reaction between ammonium carbonate and acetic acid water is produced, which water adds considerably to the corrosive action of the mixture and the products of the distillation. The reaction or conversion of ammonium acetate to acetamide by the ammonium carbonate process is slow and separation of the products by vacuum distillation cannot be carried out. This necessitates distilling at atmospheric pressure and consequently much higher temperatures which involves special and more complicated apparatus for temperature control.

We have found that acetamide or other acid amides of great purity may be made cheaply if ammonia is caused to react with acetic anhydride or other organic acid anhydrides in substantially equimolecular proportions, preferably under controlled temperatures. The reaction between ammonia and acetic anhydride results in immediate formation of acetamide. The by-product of the reaction can thus be removed by the most economical means, which yields a pure product, such as crystallizing or low temperature distillation obtained by the use of vacuum.

In accordance with our invention, we form acid amides by reacting anhydrous ammonia or substituted ammonias with an acid anhydride in substantially equimolecular proportions and preferably under controlled temperature conditions. The acid formed is then distilled from the amide which remains as a residue.

While this invention is of greatest importance in the making of acetamide, it may be also employed for making other amides such as propionamide or butyramide and also for making substituted acid amides such as acetanilid.

If ordinary acid amides are to be made, anhydrous ammonia is caused to react with the acid anhydride. If substituted ammonias or amines, whether a primary amine such as aniline or a secondary amine, are employed, substituted acid amides will be formed.

Appropriate organic acid anhydrides, such as acetic anhydride, propionic anhydride, butyric anhydride or higher acid anhydrides are caused to react with the ammonia or substituted ammonia.

The ammonia and the acid anhydride are reacted in substantially equimolecular proportion, so that in the case of making acetamide, the reaction proceeds as follows:

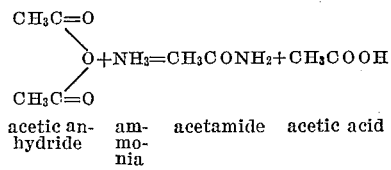

acetic an- am- acetamide acetic acid
hydride mo-
nia

We have found that if equimolecular proportions of the reactants are used, no appreciable amount of ammonium acetate is formed. This is a great advantage, since if ammonium acetate is formed, it must be converted to acetamide which complicates the process.

The reaction of the ammonia with the acid anhydride should preferably take place within certain temperature range. Thus in the case of making acetamide by reacting ammonia with acetic anhydride the temperature should not be allowed to rise above 90° C., say below 70° C. and preferably should be kept below 40° C. At the lower temperature no methyl cyanide is formed whereas traces are produced at the higher temperatures.

The acid formed by the reaction is distilled off from the acid amide and in order to avoid decomposition, this distillation is preferably carried out under reduced pressure say from 1 to 10″ of mercury absolute pressure.

By this process, excellent yields are obtained in a relatively short time. Moreover the product is of high degree of purity. Acetamide formed by this process may be used to make methylamine by reaction with a hypochlorite and an alkali, particularly as described in the U. S. patent of Bader et al. No. 1,489,380 of April 8, 1924.

In order further to illustrate our invention, but without being limited thereto the following example is given.

Example 17 parts by weight of anhydrous ammonia gas are bubbled into 102 parts by weight of acetic anhydride, the temperature being maintained at 40° C. The mixture, consisting essentially of acetamide and acetic acid, with but traces of ammonium acetate and methyl cyanide, is then distilled in a vacuum still provided with a fractionating column at a pressure of 1" to 10" mercury absolute, the acetic acid distilling off and being condensed as glacial acetic acid which may be used as such. The residue remaining in the still is acetamide practically free of impurities. The yield is high, being over 98% of theoretical.

It is to be understood that the foregoing description is given merely by way of illustration and that many variations may be made therein, without departing from the spirit of our invention.

Having described our invention, what we desire to secure by Letters Patent is:

1. In the method of producing acid amides comprising reacting at temperatures below 90° C. ammonia with anhydrides of monobasic lower aliphatic acids the step of maintaining in the reaction mixture at least one molecular proportion of anhydride to each molecular proportion of ammonia.

2. The method of forming acetamide comprising reacting ammonia with acetic anhydride in substantially equimolecular proportions at temperatures below 90° C.

3. The method of forming acetamide comprising reacting ammonia with acetic anhydride in substantially equimolecular proportions at temperatures below 40° C.

4. In the method of producing acid amides comprising reacting ammonia with anhydrides of monobasic lower aliphatic acids the step of maintaining in the reaction mixture at least one molecular proportion of anhydride to each molecular proportion of ammonia, and then distilling off the acid that is formed under subatmospheric pressure.

5. The method of forming acetamide comprising reacting ammonia with acetic anhydride in substantially equimolecular proportions at temperatures below 90° C. and then distilling off the acetic acid that is formed under subatmospheric pressure.

6. The method of forming acetamide comprising reacting ammonia with acetic anhydride in substantially equimolecular proportions at temperatures below 40° C. and then distilling off the acetic acid that is formed under subatmospheric pressure.

HERBERT E. MARTIN.
ROBERT FINLEY THOMPSON.